(12) United States Patent
Hao et al.

(10) Patent No.: US 7,930,547 B2
(45) Date of Patent: Apr. 19, 2011

(54) HIGH ACCURACY BLOOM FILTER USING PARTITIONED HASHING

(75) Inventors: Fang Hao, Morganville, NJ (US); Muralidharan Sampath Kodialam, Marlboro, NJ (US); Tirunell V. Lakshman, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 795 days.

(21) Appl. No.: 11/763,676

(22) Filed: Jun. 15, 2007

(65) Prior Publication Data

US 2008/0313132 A1    Dec. 18, 2008

(51) Int. Cl.
*H04L 9/32* (2006.01)
(52) U.S. Cl. ........................................................ 713/176
(58) Field of Classification Search .................... None
See application file for complete search history.

(56) References Cited

U.S. PATENT DOCUMENTS 7,548,928 B1 *   6/2009   Dean et al. ........................ 1/1

OTHER PUBLICATIONS

B.H. Bloom, "Space/time tradeoffs in hash coding with allowable errors," Communications of the ACM 13:7 (1970), 422-426.
A. Broder and M. Mitzenmacher, "Network applications for Bloom filters: a survey," Internet Mathematics, vol. 1, No. 4, pp. 485-509, 2005.
B. Chazelle, J. Kilian, R. Rubinfeld, and A. Tal, "The Bloomier filter: an efficient data structure for static support lookup tables," SODA 2004.
U. Manber and S. Wu, "An algorithm for approximate membership checking with application to password security," Information Processing Letters 50 (1994), 191-197.
S. Bakhtiari, R. Safavi-Naini, J. Pieprzyk, "Cryptographic Hash functions," Centre for Computer Security Research, Department of Computer Science, University of Wollongong, Wollogong, NSW 2522, Australia, 1-26.

* cited by examiner

*Primary Examiner* — Brandon S Hoffman
(74) *Attorney, Agent, or Firm* — Wall & Tong LLP

(57) ABSTRACT

A method and system for generating a bloom filter by mapping into respective groups each of a plurality of initial keys according to a first hash function and mapping each group hashed key into a bloom filter using k respective hash functions.

17 Claims, 4 Drawing Sheets

HIGH ACCURACY BLOOM FILTER USING PARTITIONED HASHING

FIELD OF THE INVENTION

The invention relates generally to information processing systems and, more particularly, to set membership query processing in for example a communication network.

BACKGROUND OF THE INVENTION

The growing importance of operations such as packet-content inspection, packet classification based on non-IP headers, maintaining flow-state and the like has led to increased interest in the networking applications of Bloom filters. Bloom filters provide a relatively easy method for hardware implementation of set-membership queries. However, the Bloom filters only provide probabilistic test and membership queries that can result in too many false positives.

A Bloom filter is a randomized, memory efficient data structure for performing membership queries. Let S be a set comprising n keys, where each key represents a search term such as might be found in a data packet or datagram. The Bloom filter stores this set in a bitmap (filter) with m bits by hashing each element in S into the bitmap using k independent uniform hash functions $h1, h2 \ldots hk$. A bit in the filter is set to one if and only if one or more keys hash to that location in the bitmap. To check whether some term x belongs to the set, the term x is hashed by computing $h1(x), h2(x), \ldots hk(x)$ such that the term x is declared a member of the set S if all the bits associated with the computed hashes of x are set to one in the filter. Assuming uniform hash functions it easy to determine the probability that a query membership test will result in a false positive.

In a paper written by Lumetta and Mitzenmacher (S. Lumetta and M. Mitzenmacher, "Using the power of two choices to improve Bloom filters", Preprint version available at http://www.eecs.harvard.edu/michaelm), for each key one of c sets of hash functions is selected so that the number of ones in the Bloom Filter is reduced. Using this methodology, each query has to hash using all c sets of hash functions and the query is declared to be in the set if it passes any one of these c sets of hash functions.

SUMMARY

The invention addressed various deficiencies in the prior art by providing methodologies using Bloom filters for set-membership queries that significantly reducing the false positive probability in comparison to existing schemes. According to the invention, a partitioned hashing method is used to provide a choice of hash functions that set far fewer bits in a Bloom filter bit vector than would be the case otherwise. This lower fill factor of the bit vector translates to a much lower false positive probability.

A method according to one embodiment of the invention comprises mapping into respective groups each of a plurality of initial keys according to a first hash function, where each group is associated with k hash functions, k being an integer greater than zero; and mapping each hashed key into a bloom filter using the k hash functions associated with its respective group. To determine if a newly arrived key is a member of the initial set of keys the newly arrived key is mapped to a group according to the first hash function and then mapped to the bloom filter using the k hash functions of the mapped to group. The newly arrived key is deemed to be a member of a set of initial keys only if mapped to set bits in the bloom filter.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The main tradeoff in using a Bloom filter based approach to set membership queries is that the Bloom filter only performs a probabilistic test and that the test can result in false positives. This false positive probability must be tuned to match application needs by appropriate choice of the number of hashes to be performed on each key and the bit vector size (memory used). For high-speed implementation, the available memory is often determined by the amount of on-chip memory in devices such as field-programmable gate arrays that are used to implement the Bloom filter. Ideally, the false positive probability should be made as low as possible given the constraints on the available memory, the number of hashes that can be performed on each key and the number of keys that must be supported. The false positive rate of the Bloom filter is proportional to the number of ones in the Bloom Filter. The number of ones may be reduced by searching for a good set of hash functions for a regular Bloom Filter. However, the inventors have determined that a brute force approach to search for good hash functions will not work due to the concentration bounds on the number of ones in the Bloom filter.

The subject invention utilizes a Partitioned Hashing approach in which a set of input keys is partitioned into disjoint subsets and a different set of hash functions is used for each subset. The partitioning of the set into disjoint subsets is done using an additional hash function. In one embodiment, the invention utilizes random hashing. In another embodiment, the invention utilizes a cyclic redundancy check (CRC) based hashing mechanism.

By partitioning the keys into subsets and using a different set of hash functions for each subset an exponential increase in the set of available hash functions is provided such that searching for a suitable hash function is much easier. Advantageously, the subject invention incurs only one additional hash compared to a regular Bloom filter.

Figure 1:
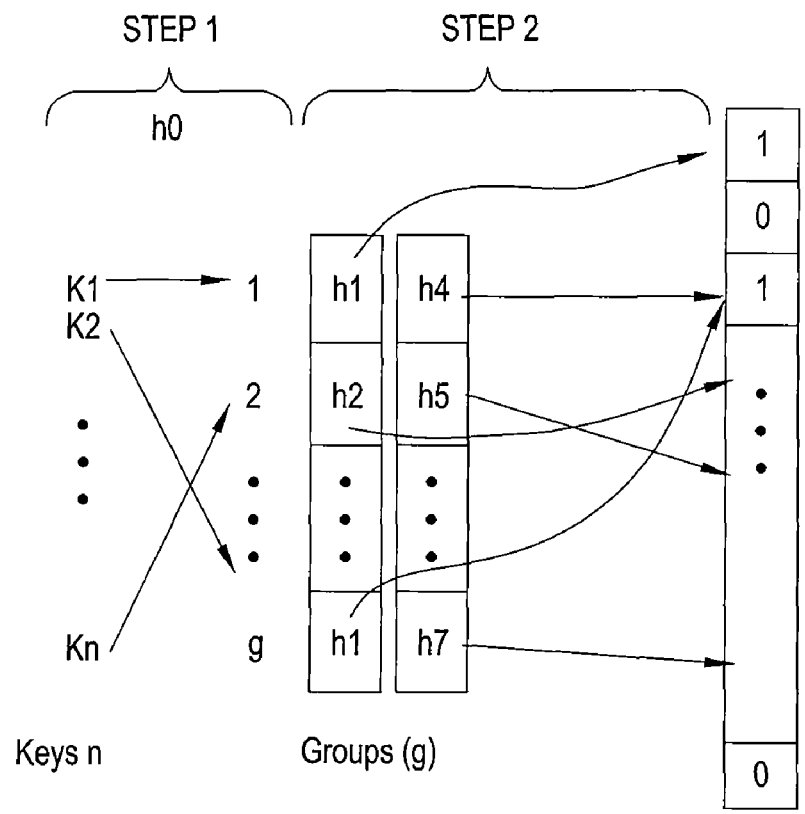
FIG. 1 depicts a distributed stream processing model according to an embodiment of the present invention.

FIG. 1 depicts a processing model according to an embodiment of the present invention. Specifically, FIG. 1 graphically depicts an embodiment of the present invention in which a two step partitioned hashing of keys is used to populate a Bloom filter vector.

In a first step, each of a plurality of keys (denoted as keys K1-Kn) is hashed into one of g groups (denoted as group 1-g) by using a hash function h0. Each group is associated with k independent hash functions. It is noted that the same hash function can be used by different groups (e.g., in FIG. 1 a hash function h1 is used within groups 1 and g). This step is described in more detail below with respect to FIG. 2.

In a second step, each key is hashed k times to the Bloom filter by using the k hash functions of its group, and the corresponding bits in the filter are set to be one. It is noted that each of the groups 1-g are depicted in FIG. 1 as using two independent hash functions (i.e., k=2). However, more or fewer hash functions may be associated with each group (i.e., k may be set to any integer value). This step is described in more detail below with respect to FIG. 3.

After the Bloom filter vector is populated with the initial keys (i.e., search terms of interest) as described herein, the Bloom filter vector is capable of being used as part of a query processing method to determine if a query key (i.e., a search term such as extracted from a packet information stream) is a member of the set of initial keys used to populate a Bloom filter vector.

Thus, within the context of a query processing method, each newly arrived key is hashed into a group using ho, and then hashed k times into the Bloom filter using the k hash functions of the group. The newly arrived key is deemed to correspond to an initial key (i.e., is considered in the set) only if all k corresponding bits in the filter are ones.

A greedy algorithm is used to select k out of H hash functions for each group, with the goal of minimizing fill factor of the filter. As shown in FIG. 9, the algorithm goes through multiple iterations until fill factor can no longer be reduced. During the initialization phase, hash functions are picked one by one for each group; selecting the hash function that gives the lowest fill factor. This phase ends after all groups are processed. The results are optionally improved with additional iterations, wherein the hash functions for each group are removed and then re-selected one at a time.

Within the context of the present invention, a fill factor of less than approximately 50% is desirable though not strictly necessary. Generally speaking, the more hash functions utilized (i.e. as k is increased) the greater the accuracy. However, this accuracy is achieved at the expense of a greater fill factor. Thus, one embodiment of the invention optimizes until the fill factor is below a threshold level, such as 40%, 50% or 60%. One embodiment of the invention optimizes until reductions in the fill factor are less than a threshold level, such as less than 5%, 2% or 1%.

In one embodiment, a counting Bloom filter is used to implement the insertion and deletion of keys as follows:

When a key is added (i.e., hashed) to a Bloom filter bit, the corresponding counter is increased. When a key is deleted (i.e., un-hashed) from a Bloom filter bit, the corresponding counter is decreased. Any positive count means the bit is set; a count of zero means otherwise. It is noted that the counting Bloom filter is suitable for searching hash functions online. In one embodiment. is no longer used once the Bloom filter is formed based the existing set of keys and selected hash functions.

Figure 2:
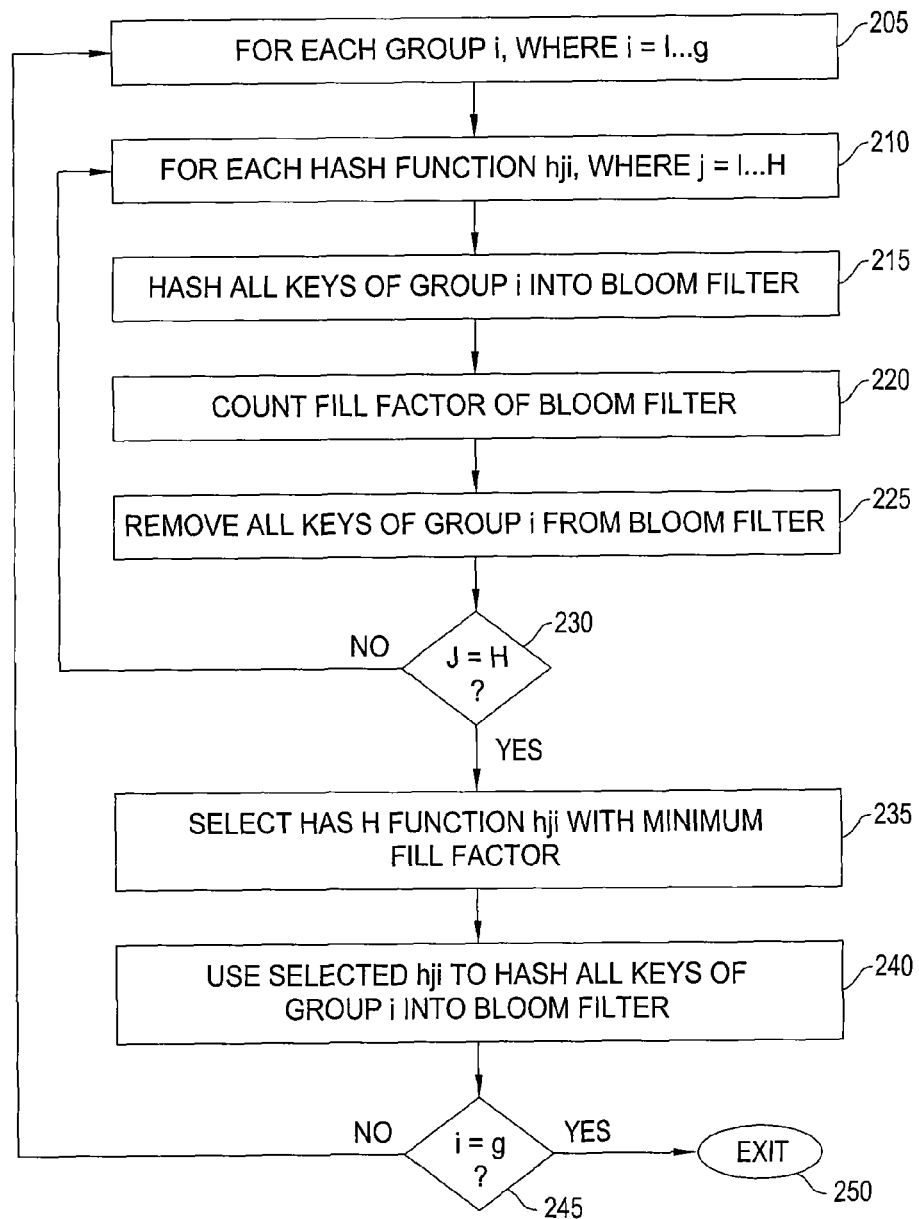
FIG. 2 depicts a pseudo code representation of a Bloom filter initialization method according to an embodiment of the invention.

FIG. 2 depicts a pseudo code representation of a Bloom filter initialization method according to an embodiment of the invention.

The method 200 of FIG. 2 is entered at step 205, where a group iteration is defined for each group i, where i iterates from 1 to g, and where g is an integer greater than 1.

At step 210, a hash function iteration is defined for each hash function $h_{ij}$, where j iterates from 1 to H, where H is an integer greater than 1.

At step 215, all keys of group i are hashed into the Bloom filter.

At step 220, the fill factor associated with the Bloom filter is counted (i.e., the number of "ones" populated a Bloom filter as a result of the hashing at step 215).

At step 225, all the keys of group i are removed from the Bloom filter. That is, all the "ones" set in the Bloom filter as a result of step 215 are reset to "zero."

At step 230 a determination is made as to whether j=H. That is, a determination is made as to whether the hash function iteration of j from 1 to H has been completed. If j does not equal H, then steps 215 through 225 are repeated for the next iteration of j. Otherwise, the method 200 proceeds to step 235.

At step 235, the hash function $h_{ji}$ that produced the smallest fill factor is selected.

At step 240, the hash function selected at step 235 is used to hash all keys of group i into the Bloom filter.

At step 245, a determination is made as to whether i=g. That is, a determination is made as to whether the group iteration of i from 1 to g has been completed. If i does not equal g, then steps 210 through 240 are repeated for the next iteration of i. Otherwise, the method 200 exits at step 250.

The method 200 of FIG. 2 provides an initial Bloom filter that may be used to perform set membership queries, but is not optimized.

Figure 3:
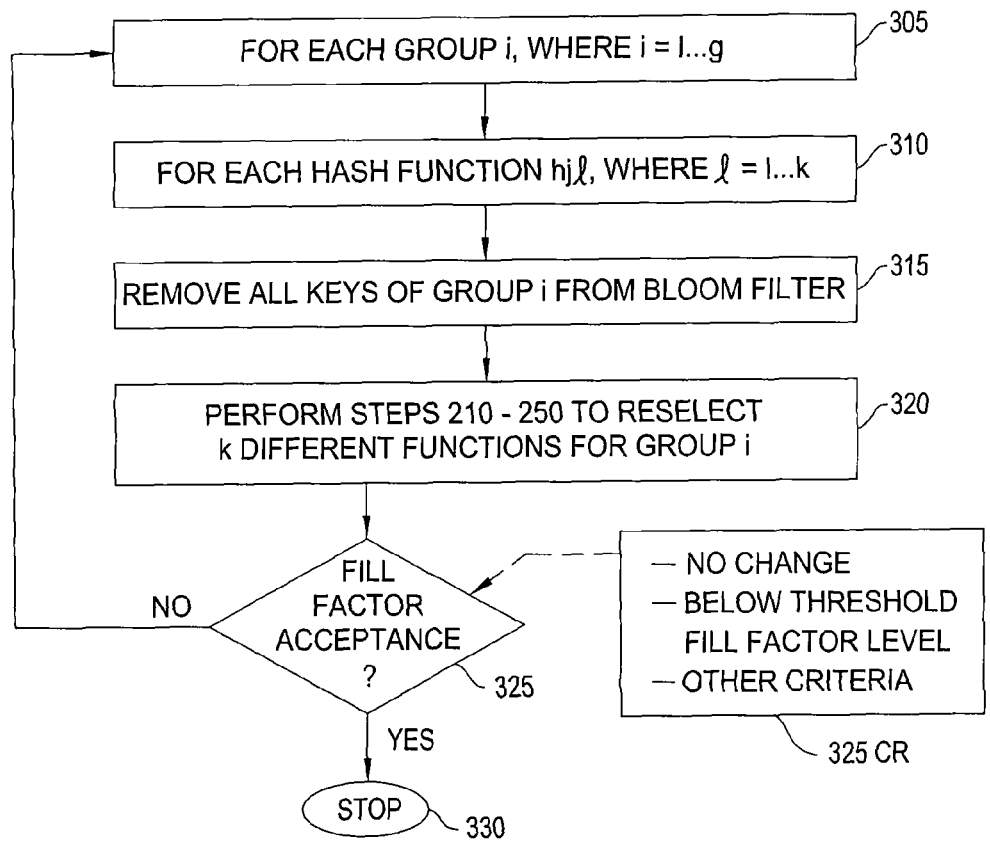
FIG. 3 depicts a pseudo code representation of a Bloom filter optimization method according to an embodiment of the invention.

FIG. 3 depicts a pseudo code representation of a Bloom filter optimization method according to an embodiment of the invention. The method 300 of FIG. 3 may be used to optimize a Bloom filter such as produced by the method 200 FIG. 2.

The method 300 of FIG. 3 is entered at step 305, where a group iteration is defined for each group i, where i iterates from 1 to g, and where g is an integer greater than 1.

At step 310, a hash function iteration is defined for each hash function $h_{iL}$, where L iterates from 1 to k, and where k is an integer greater than 1.

At step 315, all of the keys associated with group i are removed from the Bloom filter. That is, all of the bit set in the Bloom filter as a result of hashing the group i keys are reset.

At step 320, the steps 210 through 250 associated with the method 200 of FIG. 2 are repeated to select different hash functions for the group i and determine the fill factor associated with the newly selected hash functions.

At step 325, a determination is made as to whether the resulting fill factor determined at step 320 for the new hash functions is acceptable. Referring to box 325CR, acceptability of fill factor may be defined as no change from a previous fill factor, below a threshold fill factor level (i.e., number of bits in the Bloom filter below a threshold number of bits) or some other criteria. If the fill factor is not acceptable, then steps 305 through 320 are repeated. Otherwise, the method 300 exits at step 330.

The methods 200 and 300 discussed above are applicable to, for example, hashing and Bloom filters applied to the domain of data networking and computer security. For such applications, the keys comprise strings or other terms of various lengths. For instance, in an IP packet content inspection application of the invention arriving packets are tested to determine if they contain suspicious header and/or payload data (e.g., characters, words and/or terms indicative of inappropriate content or malevolent programs). To address this applications, first stage and second stage hash functions are defined as mappings from strings.

A bloom filter is formed by, for example, mapping into respective groups each of a plurality of initial keys according to a first hash function, where each group is associated with k hash functions, k being an integer greater than zero. Each hashed key is then mapped into the bloom filter using the k hash functions associated with its respective group. The bloom filter is optionally be optimized as indicated herein.

The bloom filter is use in set membership queries by mapping a newly arrived key (e.g., a portion of a data packet or datagram) to a group according to the first hash function and then mapping the newly arrived key to the bloom filter using the k hash functions associated with the group. The newly arrived key is deemed to be a member of a set of initial keys only if mapped to set bits in the bloom filter.

In one embodiment of the invention, the first stage function h0 (key) maps a key to a group as follows:

$$RS(key) \bmod g$$

where RS is a hash function such as described in detail by Robert Sedgewick in his book entitled "Algorithms in C", published by Addison-Wesley Professional, August, 2001. Other hash functions may also be used, such as cyclical redundancy checks (CRCs) and the like. For example, a paper entitled "Cryptographic Hash Functions: A Survey" by S. Bakhtiari, R. Safavi-Naini and J. Pieprzyk, (1995, Center for Computer Security Research, University of Wollongong, Australia) describes many hash functions useful within the context of the present invention, including the MD5 and SHA-1 functions.

In one embodiment of the invention, the second stage function hj (key) maps a key to a bit in Bloom filter:

$$CRC(CRC(0, key), string(R1+j \cdot R2)) \bmod m$$

where j=1 through H; R1 and R2 are two constant random numbers 2. Function CRC(crc, s) takes the four-byte integer crc as seed, and derives the 32-bit CRC checksum of the string s in addition to the seed. Function string(i) converts integer i to four-byte string. It is noted that CRC(0, s) generates the CRC checksum of string s, and CRC(CRC(0, s1),s2) generates the CRC checksum of the concatenated strings s1 and s2.

In one experiment, the inventors arbitrarily chose R1=0x5ed50e23 and R2=0x1b75e0d1. For each key, the computation for CRC(0, key) was performed only once. All second stage hash functions hj (key) were derived by using CRC(0, key) as the seed. Since string(R1+j·R2) just has four bytes, the additional calculation for each hash function hj (key) is minimal. Moreover, The only data to store for computing all the hj's are two random numbers R1 and R2. In this manner, there is essentially no hardware limit on the total number of hash functions H that the filter can use. This set of hash functions perform almost the same as independent uniform random hashing when used in Bloom filters. It is preferable to use different types of hash functions for the first and second stage to avoid unexpected correlations.

This mechanism of the present invention is well adapted for applications where a change in a set of keys occurs at a much longer time scale than membership tests for newly arrived keys. For example, for firewall applications that perform content based filtering, the set of keys may change weekly or daily though queries on membership must be performed at line speed.

In one embodiment of the invention, when new keys are added to the set of keys, the bits corresponding to the existing hash functions are set. When keys are deleted from the set of keys, the deletion is implemented by using a counting Bloom filter and then, when processing time allows, modifying the actual Bloom filter bits correspondingly. Optimization in one embodiment is performed periodically. Optimization in another embodiment is performed after a predefined number of set additions and/or set deletions. The result of optimization is then used to reset the Bloom filter.

Figure 4:
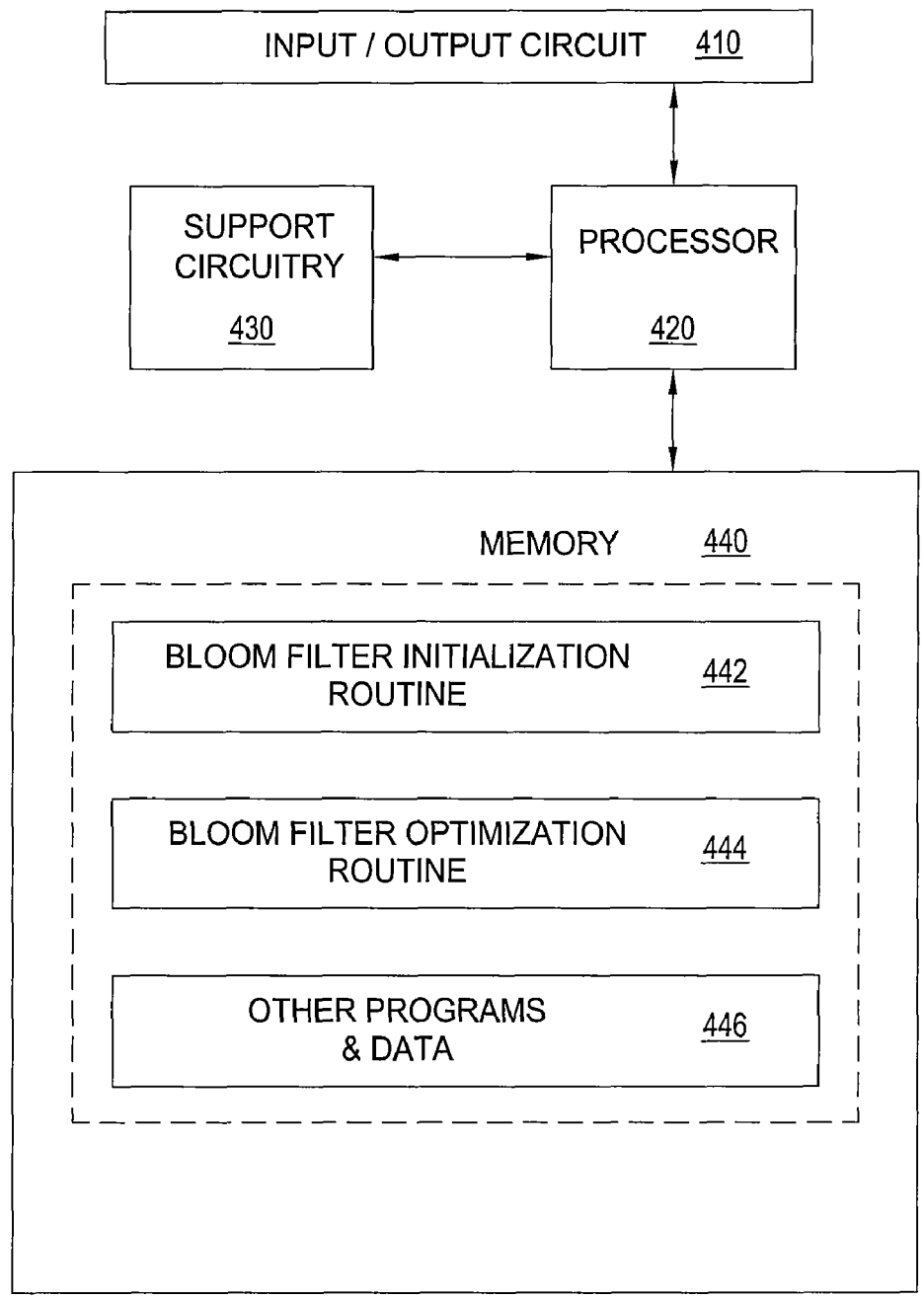
FIG. 4 depicts an processing architecture according to an embodiment of the present invention.

FIG. 4 depicts a processing architecture useful in implementing various embodiments of the present invention. Specifically, the processing architecture 400 of FIG. 4 may be used, for example, at a central or remote processing center such as a network element or network manager to process data streams and determine if they include key words or terms. Generally speaking, any of the methodologies discussed herein with respect to the present invention may be implemented using computer apparatus/architecture such as described herein with respect to FIG. 4. The apparatus/architecture of FIG. 4 is presented as a general purpose computing element adapted to perform the various stream and/or data processing tasks described herein. Moreover, while not discussed in detail herein, appropriate systems and apparatus for practicing the data structures, methodology and other aspects of the invention may be found in any system benefiting from the data processing and other techniques described herein.

FIG. 4 depicts a processing architecture 400 including a processor 420 as well as memory 440 for storing various control programs and other programs as well as data. The memory 440 may also store an operating system supporting the various programs.

The processor 420 cooperates with conventional support circuitry 430 such as power supplies, clock circuits, cache memory and the like as well as circuits that assist in executing the software routine stored in the memory 440. As such, it is contemplated that some of the steps discussed herein as software processes may be implemented within hardware, for example as circuitry that cooperates with the processor 420 to perform various steps. The processing architecture 400 also contains input/output (I/O) circuitry 410 which forms an interface between the various functional elements communicating with the architecture 400.

The architecture 400 may be advantageously employed within the context of a network management system (NMS), an element management system (EMS), network element or any other computing device used to perform a set query. More specifically, the architecture 400 may be utilized to establish and optimize a Bloom filter such as discussed above with respect to the model 100 of FIG. 1.

One embodiment of the invention comprises a system including an input/output circuit adapted to receive data streams; a memory, for storing computer instructions for a method of processing the received data stream; and a processor, for executing the computer instructions. While executing the computer instructions the processor operates to hash received data into respective groups according to a first hash function and to hash each of the groups into a bloom filter according to k respective hash functions, where k is an integer greater than zero. In this manner, a matching of received data to a desired search term is indicated when data is hashed into only set bits within the bloom filter. In this embodiment and the other embodiments discussed above, after determining that a key or search term has yielded a match, an indication of the match and/or the key or search term is stored for subsequent use, transmitted to another processing element or program, or used to trigger/instantiate a process, warning or other event.

The invention may be implemented as a computer program product wherein computer instructions, when processed by a computer, adapt the operation of the computer such that the methods, data structures and/or techniques of the present invention are invoked or otherwise provided. Instructions for invoking the inventive methods may be stored in fixed or removable media, transmitted via a data stream in a broadcast media, and/or stored within a working memory within a computing device operating according to the instructions.

Memory 440 is depicted as including, in one embodiment, a Bloom filter initialization routine for four to, a Bloom filter optimization routine and other programs and data 446, such as a snooping or search method for receiving data streams from the I/O circuit 410 and processing the received data streams using the processor 420 to determine if key word or terms are included within the data streams. Various routines and related methodologies are discussed herein.

It will be appreciated by those skilled in the art and informed by the teachings of the present invention that while the memory 440 includes a plurality of data structures, algorithms and storage regions, there is no requirement within the context of the present invention that a single memory device as depicted be utilized within the context of the update-stream processing architecture. Specifically, any combination of internal, external and/or associated memory may be utilized to store the software instructions necessary to provide the various functions. Thus, while the architecture depicts the memory as an integral portion of a relatively unified structure, the memory 440 may in fact be distributed internal or external to the update-stream processing architecture 400.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A non-transitory computer readable storage medium including instructions which, when executed by a processor, perform a method comprising:
   partitioning into respective groups, each of a plurality of initial keys according to a first hash function, where each group is associated with a respective set of k hash functions, wherein a different set of k hash functions is used for each group, k being an integer greater than zero, said first hash function being different than said k hash functions; and
   mapping each hashed key into a bloom filter using the k hash functions associated with its respective group.

2. The method of claim 1, further comprising:
   mapping a newly arrived key to a group according to the first hash function; and
   mapping the newly arrived key to the bloom filter using the k hash functions of the mapped to group; wherein
   the newly arrived key is deemed to be a member of a set of initial keys only if mapped to set bits in the bloom filter.

3. The method of claim 1, wherein respective k hash functions associated with groups are selected by iteratively adapting the k hash functions until a fill factor of the bloom filter is below a threshold level.

4. The method of claim 1, wherein respective k hash functions associated with groups are selected by iteratively adapting the k hash functions until a fill factor of the bloom filter does not decrease between iterations.

5. The method of claim 1, wherein respective k hash functions associated with groups are selected by iteratively adapting the k hash functions until a fill factor of the bloom filter does not decrease by more than a threshold level.

6. The method of claim 1, wherein said hash functions comprise random hash functions.

7. The method of claim 1, wherein said hash functions comprise cyclic redundancy check (CRC) based hash functions.

8. The method of claim 1, wherein said computer readable medium comprises a memory within a network element adapted to process data streams to determine if the data streams include key terms.

9. A system, comprising:
   an input/output circuit adapted to receive data streams;
   a memory, for storing computer instructions for a method of processing the received data stream; and
   a processor, for executing the computer instructions;
   wherein while executing the computer instructions the processor operates to hash received data into respective groups according to a first hash function wherein a different set of k hash functions is used for each group, and to hash each of the groups into a bloom filter according to k respective hash functions, where k is an integer greater than zero, said first hash function being different than said k hash functions; whereby
   a matching of received data to a desired search term is indicated when data is hashed into set bits within the bloom filter.

10. The system of claim 9, wherein the set bits within the bloom filter are initially determined by:
   mapping into respective groups each of at least one search terms according to the first hash function, where each group is associated with k hash functions, k being an integer greater than zero; and
   mapping each hashed key into a bloom filter using the k hash functions associated with its respective group.

11. The system of claim 10, wherein respective k hash functions associated with groups are selected by iteratively adapting the k hash functions until a fill factor of the bloom filter is below a threshold level.

12. The system of claim 10, wherein respective k hash functions associated with groups are selected by iteratively adapting the k hash functions until a fill factor of the bloom filter does not decrease between iterations.

13. The system of claim 10, wherein respective k hash functions associated with groups are selected by iteratively adapting the k hash functions until a fill factor of the bloom filter does not decrease by more than a threshold level.

14. The system of claim 9, wherein said hash functions comprise random hash functions.

15. The system of claim 9, wherein said hash functions comprise cyclic redundancy check (CRC) based hash functions.

16. A computer program product wherein computer instructions, when processed by a computer, adapt the operation of the computer to perform a method of processing a received data stream, the method comprising:
   hashing received data into respective groups according to a first hash function wherein a different set of k hash functions is used for each group; and
   hashing each of the groups into a bloom filter according to k respective hash functions, where k is an integer greater than zero, said first hash function being different than said k hash functions; whereby a matching of received data to a desired search term is indicated when data is hashed into set bits within the bloom filter.

17. Apparatus for processing a received data stream to identify desired search terms, comprising:
   means for hashing received data into respective groups according to a first hash function wherein a different set of k hash functions is used for each group; and
   means for hashing each of the groups into a bloom filter according to k respective hash functions, where k is an integer greater than zero, said first hash function being different than said k hash functions;
   wherein a matching of received data to a desired search term is indicated when data is hashed into set bits within the bloom filter.

* * * * *